United States Patent
Gonin

(10) Patent No.: US 8,801,084 B2
(45) Date of Patent: Aug. 12, 2014

(54) REAR-END ELEMENT AND REAR END FOR MOTOR VEHICLE

(71) Applicant: Faurecia Bloc Avant, Nanterre (FR)

(72) Inventor: Vincent Gonin, Montbeliard (FR)

(73) Assignee: Faurecia Bloc Avant, Nanterre (FR)

( * ) Notice: Subject to any disclaimer, the term of this patent is extended or adjusted under 35 U.S.C. 154(b) by 0 days.

(21) Appl. No.: 13/967,935

(22) Filed: Aug. 15, 2013

(65) Prior Publication Data

US 2013/0328351 A1 Dec. 12, 2013

Related U.S. Application Data

(62) Division of application No. 13/100,662, filed on May 4, 2011, now Pat. No. 8,585,130.

(30) Foreign Application Priority Data

May 5, 2010 (FR) ...................................... 10 53495

(51) Int. Cl.
*B60J 7/00* (2006.01)

(52) U.S. Cl.
USPC .................................................... 296/187.11

(58) Field of Classification Search
USPC ............... 296/187.11, 146.6, 187.09, 193.08, 296/203.04; 180/89.1
See application file for complete search history.

(56) References Cited

U.S. PATENT DOCUMENTS

| | | | | |
|---|---|---|---|---|
| 5,425,561 A | * | 6/1995 | Morgan | 293/120 |
| 5,819,408 A | * | 10/1998 | Catlin | 29/897.2 |
| 5,988,713 A | * | 11/1999 | Okamura et al. | 293/120 |
| 6,237,990 B1 | * | 5/2001 | Barbier et al. | 296/187.09 |
| 6,540,275 B1 | * | 4/2003 | Iwamoto et al. | 293/24 |
| 6,547,317 B1 | * | 4/2003 | Cheron et al. | 296/193.01 |
| 6,846,037 B2 | * | 1/2005 | Engels et al. | 296/193.04 |
| 7,681,700 B2 | * | 3/2010 | Ginja et al. | 188/377 |
| 7,879,435 B2 | * | 2/2011 | Mett et al. | 428/166 |
| 8,104,996 B2 | * | 1/2012 | Goebel et al. | 405/284 |
| 8,118,346 B2 | * | 2/2012 | Ginja et al. | 296/187.03 |
| 8,118,351 B2 | * | 2/2012 | Gonin et al. | 296/193.09 |
| 8,235,433 B2 | * | 8/2012 | Gonin | 293/120 |
| 8,251,437 B2 | * | 8/2012 | Gonin et al. | 296/187.09 |
| 8,267,446 B2 | * | 9/2012 | Gonin | 293/136 |
| 8,336,933 B2 | * | 12/2012 | Nagwanshi et al. | 293/132 |

(Continued)

FOREIGN PATENT DOCUMENTS

| | | |
|---|---|---|
| EP | 1293389 | 3/2009 |
| EP | 2135776 | 12/2009 |

(Continued)

OTHER PUBLICATIONS

French Search Report, dated Dec. 15, 2010, in FR 1053495/FA 735494.

*Primary Examiner* — Kiran B Patel

(74) *Attorney, Agent, or Firm* — Young & Thompson

(57) ABSTRACT

A rear-end element (2) for a motor vehicle includes a carrier structural element (6) forming an energy-absorbing element after impact, and a carrier structural frame (8). At least the carrier structural element (6) has a cellular structure formed of cells (30, 32) extending longitudinally through the carrier structural element (6) between a back face and a front face of the carrier structural element (6) and opening onto the back and/or front face of the carrier structural element (6). A rear end (44) which includes the rear-end element (2).

7 Claims, 4 Drawing Sheets

(56) References Cited

U.S. PATENT DOCUMENTS

| | | | |
|---|---|---|---|
| 2006/0049650 A1* | 3/2006 | Evans | 293/120 |
| 2006/0181089 A1* | 8/2006 | Andre et al. | 293/120 |
| 2007/0036616 A1* | 2/2007 | Knudson et al. | 405/284 |
| 2009/0160203 A1* | 6/2009 | Garg et al. | 293/120 |
| 2010/0127520 A1* | 5/2010 | Ginja et al. | 293/146 |
| 2011/0115241 A1* | 5/2011 | Gonin | 293/120 |
| 2011/0121586 A1* | 5/2011 | Gonin | 293/132 |

FOREIGN PATENT DOCUMENTS

| | | |
|---|---|---|
| EP | 2241480 | 10/2010 |
| FR | 2895341 | 6/2007 |
| FR | 2908715 | 5/2008 |

* cited by examiner

REAR-END ELEMENT AND REAR END FOR MOTOR VEHICLE

CROSS REFERENCE TO RELATED APPLICATIONS

This application is a division of copending application Ser. No. 13/100,662 filed on May 4, 2011; which claims priority to FR application 1053495 filed on May 5, 2010. The entire contents of each of the above-identified applications are hereby incorporated by reference.

BACKGROUND OF THE INVENTION

1. Field of the Invention

The present invention relates to a rear-end element of a motor vehicle adapted to close an upper part and a lower part of a body structure of the vehicle, comprising:

- a carrier structural element forming an energy-absorbing element after impact which is mobile relative to the lower part of the body structure, the absorbing element being adapted to distribute the forces generated by a rear-end impact towards a bearing surface of the body structure,
- a carrier structural frame mobile relative to the upper part of the body structure.

2. Description of the Related Art

Modern motor vehicles are designed so that they suitably meet different types of possible rear-end impacts such as low speed impacts or « parking impacts » at speeds of between 2.5 and 4 km/h (ECE42) and medium speed impacts or « repairability impacts », at speeds of about 16 km/h (Danner).

Document EP 1 162 116 A1 discloses a rear bumper of a motor vehicle comprising a central block and two side blocks. The central block comprises an outer shell surrounding a single, rectilinear, metal cross member and a rigid structure whose ends, via impact absorbers, bear upon side members of the vehicle.

The two side blocks are fixed, and on this account they allow the bumper to conform to rear-end impact standards, in particular to offset impacts.

However, the architecture of said bumper is complex and costly to manufacture. In addition, the fixed side blocks hamper access to the inner volume of vehicle and considerably reduce the cross dimension of the loading threshold. Additionally, it is not optimized for integrating other elements of a rear end of a motor vehicle such as optics or other components.

BRIEF SUMMARY OF THE INVENTION

It is an objective of the present invention to propose a rear-end element adapted to provide efficient energy absorption in the event of a low or medium speed impact, whilst being simple and low-cost in fabrication and without limiting access to the inner volume of the motor vehicle.

For this purpose, the subject of the invention is a rear-end element of the above-mentioned type, in which at least the carrier structural element has a cellular structure formed of cells extending longitudinally through the carrier structural element between a back face and a front face of the carrier structural element and opening onto the back and/or front face of the carrier structural element.

According to other embodiments, the invention comprises one or more of the following features:
- the carrier structural frame has a cellular or ribbed structure;
- the cells are blind on the side of the front and/or back face;
- the cellular structure comprises first blind cells closed on the side of the back face and open on the side of the front face, and second blind cells open on the side of the back face and closed on the side of the front face;
- the first and second cells are in staggered rows;
- the carrier structural element and the carrier structural frame are made in a rigid plastic material;
- the carrier structural element and the carrier structural frame are two independent parts adapted to be joined to each other so as to form a structural framework;
- the carrier structural element and the carrier structural frame are made in one piece and form a structural framework;
- the carrier structural element is a single block and comprises a first lower cross member and a first upper cross member extending substantially horizontally and at least two vertical jambs connecting together the first lower and upper cross members, extending substantially upwards from the first upper cross member and each forming a side edge of the carrier structural element;
- the carrier structural element comprises at least one structural zone forming a multi-purpose interface such as a support for a visual information device; and
- the carrier structural frame comprises a second lower cross member, a second upper cross member and two vertical jambs connecting together the second lower and upper cross members and each forming a side edge of the carrier structural frame.

A further subject of the invention is a rear end of a motor vehicle comprising;
- a body structure,
- the rear-end element comprising a carrier structural element and a carrier structural frame such as defined above, the element being mobile relative to the body structure; and
- a bottom back panel covering the carrier structural element at the rear end.

According to other embodiments, the rear end comprises one or more of the following features:
- a rear window of the vehicle is arranged on the carrier structural frame of the rear-end element;
- the rear end also comprises hinges adapted to ensure a mobile connection between the rear-end element and the body structure of the motor vehicle and/or comprises locks adapted to hold the rear end element bearing against body structure of the motor vehicle in a closed position; and
- the rear end is in the form of a hatch or swing door.

BRIEF DESCRIPTION OF THE DRAWINGS

The invention will be better understood on reading the following description given solely as an example and with reference to the appended drawings in which.

DETAILED DESCRIPTION OF THE PREFERRED EMBODIMENTS

In the following description the expressions «front« and «rear» are construed with the reference to the usual orientation of motor vehicles illustrated in FIG. 1 by the arrow S directed horizontally to the front along a longitudinal direction of the motor vehicle.

Figure 1:
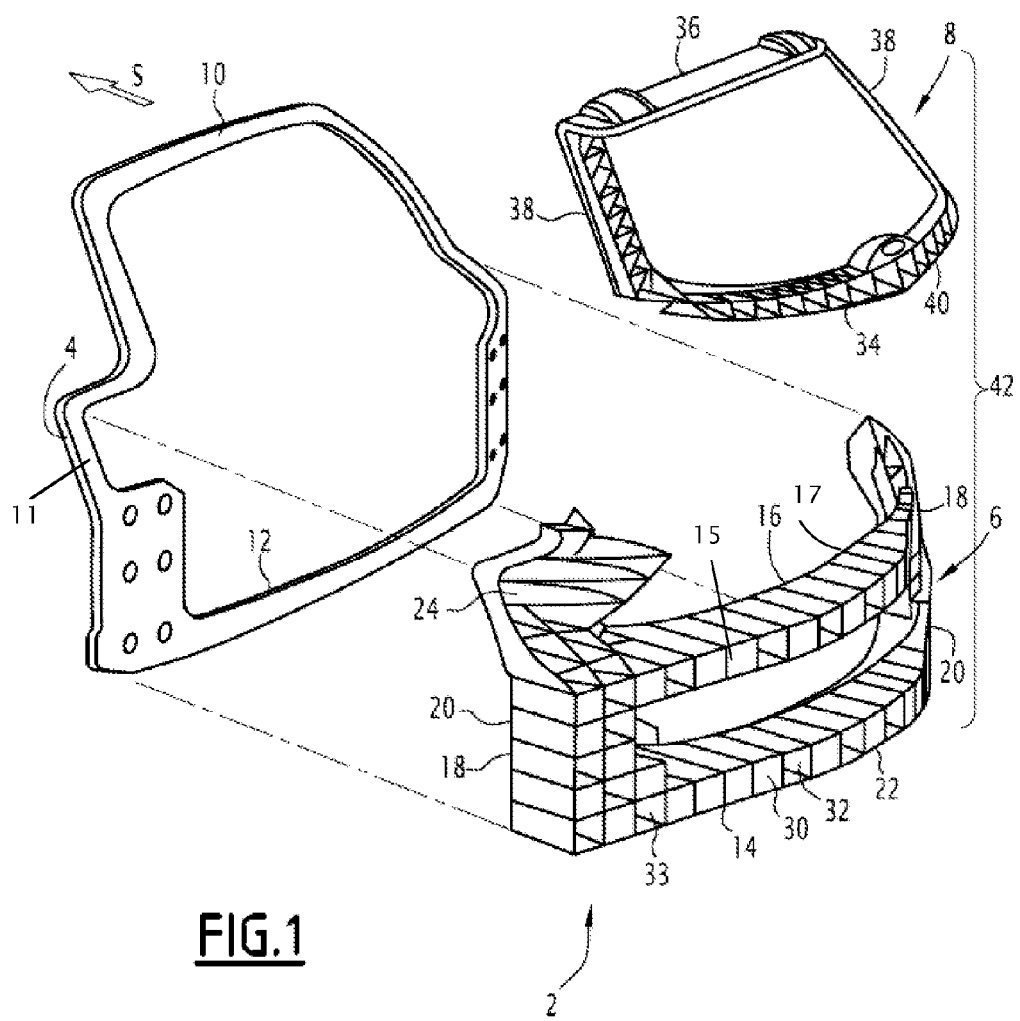
FIG. 1 is a perspective, exploded view of a rear-end element according to a first embodiment of the invention and of a body structure.

FIG. 1 is an exploded view of a first embodiment of a rear-end element designated under reference 2 and of a body structure 4. The rear-end element 2 has a global shape that is adapted to cooperate with the body structure 4. The rear-end element 2 comprises a carrier structural element 6 and a carrier structural frame 8.

The body structure 4 acts as frame for a rear door of a motor vehicle. The body structure 4 has a closed profile forming a rigid bearing area. The body structure 4 comprises an upper part 10 and a lower part 12 which is reinforced to withstand small rear-end impacts without undergoing permanent deformation.

The body structure 4 is adapted to give support to the carrier structural element 6 and the carrier structural frame 8. The carrier structural element 6 is secured to the carrier structural frame 8, the assembly forming a rear door of hatch type. Securing of the element 6 to the frame 8 can be achieved by screwing or bonding for example. As a variant, the carrier structural frame 8 is independent of the carrier structural element 6. According to this variant, the carrier structural element 6 is rigidly fixed to the body structure 4 similar to a conventional rear cab shield, or it can be moved by kinematics different from the carrier structural frame 8 in the manner of a tail gate.

This assembly of the element 6 and of the frame 8 forming a door is mobile relative to the body structure 4 defined by the lower part 12 and the upper part 10, between an open position adapted to allow access to the rear volume and a closed position ensuring the impregnability of the vehicle.

The bearing area, which is the bearing surface 11 of body structure 4, offered by the body structure 4 advantageously has reinforced widened zones directly above the rear side members, substantially of between 100 and 250 mm in width and between 300 and 400 mm in height. These dimensions may vary depending on the size of the motor vehicle without departing from the scope of the invention.

The carrier structural element 6 comprises a first lower cross member 14, a first upper cross member 16 extending substantially horizontally and two vertical jambs 18. Nonetheless the number of the vertical jambs 18 is not limited to two. The carrier structural element 6 may comprise any number of vertical jambs 18. In addition, the carrier structural element 6 may comprise other cross members in addition to the first lower and upper cross members 14, 16. For esthetic reasons, the first lower and upper cross members 14, 16 and the vertical jambs 18 may be curved.

The two vertical jambs 18 connect together the ends of the first lower and upper cross members 14, 16 and are extended substantially upwards above the first upper cross member 16. Each vertical jamb 18 forms a side edge 20 of the carrier structural element 6. The first lower cross member 14 forms a lower edge 22 of the carrier structural element 6.

As a variant, the carrier structural element 6 does not comprise any first upper cross member 16.

That part of the vertical jambs 18 projecting above the first upper cross member 16 is adapted to cooperate with the carrier structural frame 8.

The carrier structural element 6 also has at least one structural zone 24 as multi-purpose interface. The structure of this zone 24 is adapted to receive or support visual information devices 26, various accessories and/or a license plate.

The longitudinal thickness of the carrier structural element 6, i.e. the thickness between a back face 15 and a front face 17 of the carrier structural element 6, is substantially between 120 and 220 cm.

The carrier structural element 6 is conformed to act as energy absorber of a rear-end impact and to distribute the forces generated by this rear-end impact. Preferably, the carrier structural element 6 is designed to absorb energy higher than 5 kJ, preferably of between 6 and 10 kJ, in the event of a medium speed impact («Danner»).

For this purpose, the carrier structural element 6 has a cellular structure formed of cells 30, 32. The cells 30, 32 extend longitudinally through the carrier structural element 6 between the back face 15 and the front face 17 of the carrier structural element 6. The cells 30, 32 open onto the back face and/or front face of the carrier structural element 6 and are laterally limited by walls 33. Preferably the cells 30, 32 are blind on the front face and/or back face forming «crash boxes». In a particularly preferred manner, the cellular structure comprises first blind cells 30, closed on the side of the back face 15 and open on the side of the front face 17 in a manner similar to the second blind cells 32 shown as open on the side of the back face 15 in FIG. 1, and second blind cells 32 open on the side of the back face 15 and closed on the side of the front face 17 in a manner similar to the first blind cells 32 shown as closed on the side of the back face 15 in FIG. 1. The first cells 30 and the second cells 32 are arranged in staggered rows (or chequered fashion).

The staggered cellular structure provides for homogeneous design of the carrier structural element 6, and is intended to act as energy absorber essentially in compression in buckling mode. The chosen geometry, formed of reversed blind cells arranged in staggered rows considerably increases the adhering surface behind the carrier structural element 6 and takes part in the favourable distribution of forces in the event of a rear-end impact.

The carrier structural element 6 is in a single block i.e. the first lower and upper cross members 14, 16 and the vertical jambs 18 are in one piece or are welded together. The carrier structural element 6 or individually the first upper and lower cross members 14, 16 and the vertical jambs 18 are made in a rigid plastic material e.g. by injection moulding of a thermoplastic polymer material such as polypropylene (PP).

The cellular structure facilitates manufacture by injection moulding. A moulded part having the above-mentioned cellular structure in staggered (chequered) arrangement can be released from the mould in a single direction corresponding to the longitudinal direction of the motor vehicle. The staggered arrangement allows for a large draft angle which facilitates proper mould release and also allows cells 30, 32 to be obtained with walls 33 of constant thickness. The cellular structure allows small even zero draft angles. Therefore the mould release of the moulded parts is further facilitated and can be performed by moving two opposite semi-moulds in opposite directions along an axis corresponding to the longitudinal axis of the vehicle. It is therefore not necessary to provide drawers or mobile parts in the mould.

In addition, the cellular structure of the carrier structural element 6 allows a reduction in the local thicknesses of the walls 33 delimiting the cells 30, 32 whilst maintaining sufficient energy-absorption capacity. This local thickness can therefore be reduced over a range of between 2.5 and 4 mm, advantageously between 3 mm and 3.5 mm. The carrier structural element 6 of cellular structure thus obtained is therefore lightweight and offers savings in material thereby limiting production costs.

Also, the low, even zero, draft angles of the chequered cellular structure of the carrier structural element 6 allows uniform stiffness to be obtained in the event of longitudinal deflection, for example during a medium speed impact. It is therefore possible to obtain a substantially constant load level as a function of the compression of the carrier structural element 6, which increases the fraction of dissipated energy and reduces the distance of absorption whilst avoiding the deformation of other elements of the motor vehicle.

The carrier structural frame 8 comprises a second lower cross member 34, a second upper cross member 36 extending substantially horizontally and two vertical jambs 38. The two vertical jambs 38 are arranged between the second lower and upper cross members 34, 36 such as to join together the ends of the second lower and upper cross members 34, 36 forming a framework.

The second lower cross member 34 forms a lower edge 40 of the carrier structural frame 8. The lower edge 40 is adapted to cooperate with that part of the vertical jambs 18 that projects above the first upper cross member 16 of the carrier structural element 6, either permanently (assembly of the carrier structural frame 8 with the carrier structural element 6 to form a single door of hatch type) or non-permanently (locking and unlocking of the carrier structural frame 8 that is mobile relative to the carrier structural element 6 or vice versa between an open position and a closed position).

The carrier structural frame 8 is in a single piece i.e. the second lower and upper cross members 34, 36 and the vertical jambs 38 are advantageously moulded together (single injection) or welded together. The carrier structural frame 8 or individually the second lower and upper cross members 34, 36 and the vertical jambs 38 are made in a rigid plastic material, for example by injection moulding of a thermoplastic polymer material such as polypropylene (PP).

The carrier structural frame 8 has a cellular structure such as mentioned above or a ribbed structure.

In the embodiment in which the carrier structural element 6 does not comprise any first upper cross member 16, the second lower cross member 34 of the carrier structural frame 8 is able to distribute impact-generated energy between the jambs 18 of the carrier structural element 6.

In the first embodiment, illustrated in FIG. 1, the carrier structural element 6 and the carrier structural frame 8 are made in two individual parts adapted to be assembled together by bonding, friction welding, by laser or by screwing. The frame 8 is arranged above the element 6 and the lower edge 40 of the frame 8 is fixed to that part of the vertical jambs 18 projecting above the first upper cross member 16 of the element 6 to form a structural framework 42.

Figure 2:
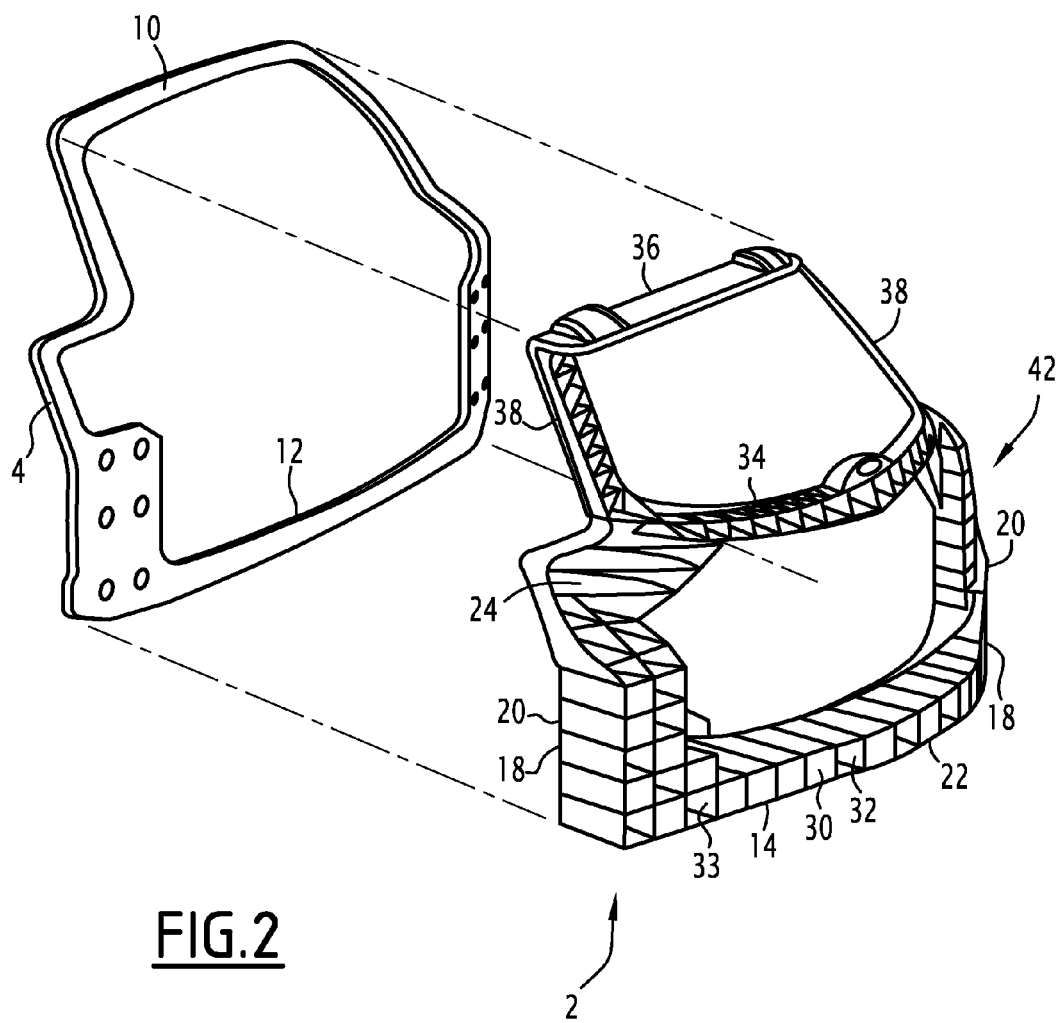
FIG. 2 is a perspective, exploded view of a rear-end element according to a second embodiment of the invention, and of the body structure in FIG. 1.

In a second embodiment, the structural framework 42 is made in one piece as illustrated in FIG. 2. The structural framework 42 is made by injection moulding. The elements of the structural framework 42 made in one piece (second embodiment) are identical to those of the structural framework 42 assembled from element 6 and frame 8 (first embodiment). In this case as well, the first upper cross member 16 can be included or omitted.

Figure 3:
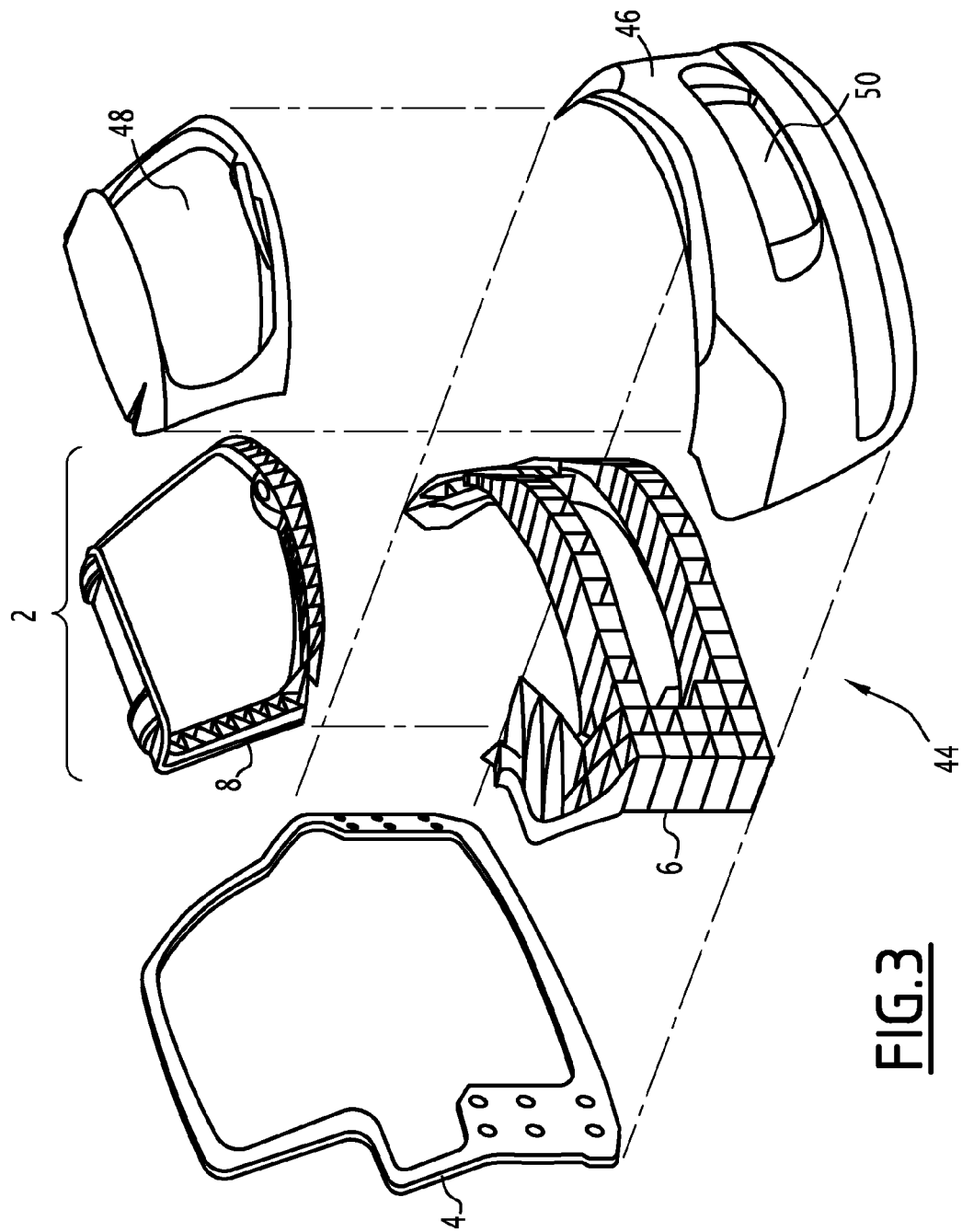
FIG. 3 is a perspective, exploded view of a rear end of a vehicle according to the invention.

The invention also relates to a rear end 44 of a vehicle such as illustrated in FIG. 3. The rear end 44 comprises the body structure 4, the rear-end element 2 according to the first or second embodiment, a bottom back panel 46 and a top back panel 48. In the example illustrated in FIG. 3, the rear-end element 2 is the element according to the first embodiment.

Figure 4:
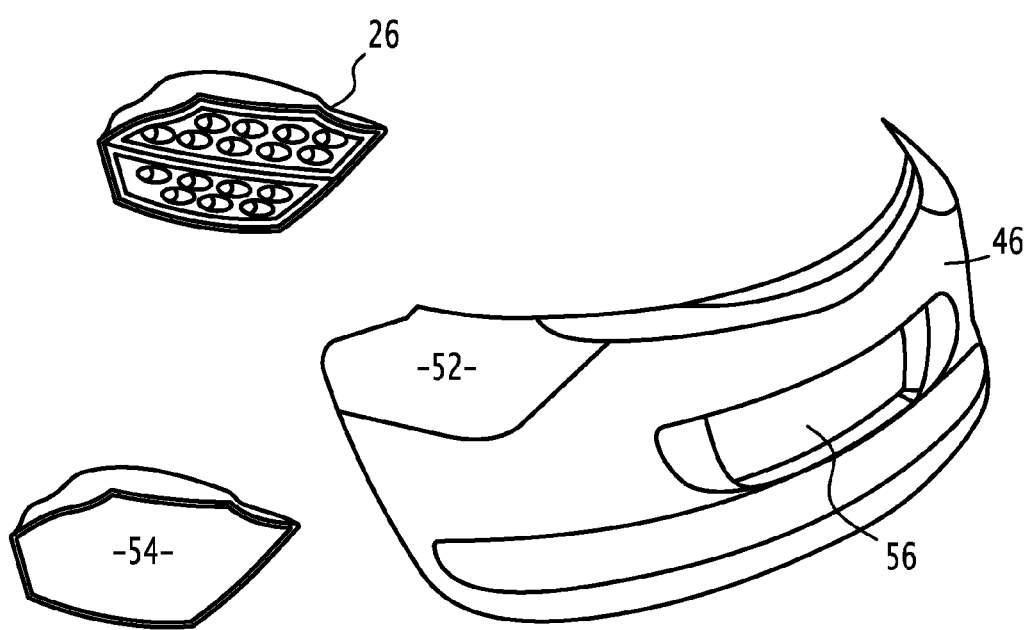
FIG. 4 is a perspective, exploded view of a bottom back panel of a rear end of a vehicle according to the invention.

The bottom back panel 46 is adapted to be fixed at the rear onto the carrier structural element 6 and is intended to form the outer bodywork part at the lower part of the vehicle. The bottom back panel 46 may be a metal or plastic bodywork panel. The bottom back panel 46 is illustrated in more detail in FIG. 4.

The bottom back panel 46 comprises structural zones 50 forming a multi-purpose interface adapted to cooperate with the structural zones 24 of the carrier structural element 6. In the example illustrated in FIG. 4, the structural zones 50 comprise a first zone 52 adapted to receive a casing 54 for lighting provided with the visual information device 26 and a second zone 56 adapted to receive the license plate. Nevertheless structural zones 50 other than the first and second zones 52, 56 can be envisaged.

The top back panel 48 is adapted to be fixed at the rear onto the carrier structural frame 8 and is intended to form the outer bodywork part at the upper part of the vehicle. The top back panel 48 may be a rear window. As a variant, the top back panel 48 may also integrate a spoiler.

The bottom and top back panels 46, 48 may be joined together forming an integral structure. For repair reasons of the rear end 44 after a rear-end impact for example, it is nevertheless preferable for these to be separate and to be mounted individually on the structural framework 42.

The top back panel 48 may be merged in a single piece with the carrier structural frame 8, but here again it is advantageous for them to be separate for repair reasons and also for manufacture-related reasons.

The rear end 44 further comprises hinges (not illustrated) adapted to connect the rear-end element 2 to the body structure 4 of the motor vehicle in a mobile manner mobile in particular by pivoting. The hinges may be located on a side, above or below the rear-end element 2. The rear end 44 further comprises locks (not illustrated) adapted to maintain the rear-end element 2 bearing against the body structure 4 of the motor vehicle in closed position.

The rear end 44 such as described above acts as a hatch or rear swing door of the motor vehicle.

The rear-end element 2 according to the invention comprises few individual parts which additionally are lightweight and, due to the cellular structure, are simple to manufacture whilst providing efficient absorbing of rear impact energy. Therefore the manufacturing cost of this rear-end element 2 is low. The design of the elementary components of the rear end 44 allows for easy repair of the energy absorbing element, in particular the carrier structural element 6, without having to change the entire rear end 44. This reduces the cost of repair. In addition, the energy-absorbing element according to the invention does not hamper access to the inner volume of the vehicle and allows the integration of structural elements such as optics, parking sensors and/or reversing cameras.

The arrangement of the structural elements added onto the structural framework 42 each relative to the other is optimized and allows optimal treatment of clearances and flush aligning between the elements. As a result, the clearances between the optical supports 54 and the rear end bodywork and between the rear window 48 and the bodywork are eliminated. This provides a rear end of satisfactory esthetic design.

The invention claimed is:
1. A rear end of a motor vehicle, the rear end comprising:
a body structure;
a rear-end element of the motor vehicle movable relative to the body structure and configured to close an upper part and a lower part of the body structure of the vehicle, the rear-end element comprising
- a carrier structural element forming an energy-absorbing element after impact and being mobile relative to the lower part of the body structure, the absorbing element being configured to distribute forces generated by a rear-end impact towards a bearing surface of the body structure, and
- a carrier structural frame movable with respect to the upper part of the body structure; and
- a bottom back panel covering the carrier structural element at the rear end of the vehicle, wherein at least the carrier structural element has a cellular structure formed of cells extending longitudinally through the carrier structural element between a back face and a front face of the carrier structural element and opening onto the back and/or front face of the carrier structural element.

2. The rear end according to claim 1, wherein a rear window of the vehicle is disposed on the carrier structural frame of the rear-end element.

3. The rear end according to claim 1, further comprising at least one of hinges configured to join the rear-end element to the body structure of the motor vehicle in a movable manner, and locks configured to hold the rear-end element bearing against the body structure of the motor vehicle in a closed position.

4. The rear end according to claim 1, wherein the rear end comprises a hatch or swing door.

5. The rear end according to claim 2, further comprising at least one of hinges configured to join the rear-end element to the body structure of the motor vehicle in a movable manner, and locks configured to hold the rear-end element bearing against the body structure of the motor vehicle in a closed position.

6. The rear end according to claim 2, wherein the rear end comprises a hatch or swing door.

7. The rear end according to claim 3, wherein the rear end comprises a hatch or swing door.

* * * * *